(12) United States Patent
Perlman

(10) Patent No.: US 8,425,632 B2
(45) Date of Patent: Apr. 23, 2013

(54) COMPOSITE FUEL FOR FIRES

(75) Inventor: Daniel Perlman, Arlington, MA (US)

(73) Assignee: Perlman Consulting LLC, Arlington, MA (US)

( * ) Notice: Subject to any disclaimer, the term of this patent is extended or adjusted under 35 U.S.C. 154(b) by 0 days.

(21) Appl. No.: 13/204,993

(22) Filed: Aug. 8, 2011

(65) Prior Publication Data

US 2013/0040248 A1 Feb. 14, 2013

(51) Int. Cl.
*C10L 5/00* (2006.01)
*C10L 1/18* (2006.01)

(52) U.S. Cl.
USPC ............ 44/502; 44/503; 44/302; 44/451; 44/388; 44/308

(58) Field of Classification Search ............ 44/502, 44/503, 504, 542, 545, 302, 451, 388, 308
See application file for complete search history.

(56) References Cited

U.S. PATENT DOCUMENTS

| | | | |
|---|---|---|---|
| 2,059,208 A * | 11/1936 | Chaney | 44/502 |
| 2,170,326 A * | 8/1939 | Headland | 44/544 |
| 2,838,384 A | 6/1958 | Sloan et al. | |
| 3,779,693 A | 12/1973 | McKenney et al. | |
| 3,801,292 A | 4/1974 | Tanner | |
| 4,156,594 A | 5/1979 | Tarpley, Jr. | |
| 4,157,242 A | 6/1979 | Tarpley, Jr. | |
| 4,165,968 A | 8/1979 | Duncan | |
| 4,238,201 A | 12/1980 | Spilles | |
| 4,365,971 A | 12/1982 | Monick | |
| 4,786,290 A | 11/1988 | Wyer | |
| 5,143,045 A | 9/1992 | Minnis | |
| 5,226,405 A | 7/1993 | Snow | |
| 5,252,107 A * | 10/1993 | Wilkins, Jr. | 44/603 |
| 5,296,004 A * | 3/1994 | Johnson et al. | 44/545 |

* cited by examiner

*Primary Examiner* — Cephia D Toomer
(74) *Attorney, Agent, or Firm* — McLane, Graf, Raulerson & Middleton, P.A.

(57) ABSTRACT

Various aspects of the present invention generally relate to a fuel composition, for example, that may be used as a fire starter for igniting barbecue charcoal, firewood, campfires, pellet stoves, and the like, and/or as a fuel material, e.g., for heating or cooking. A fuel composition is described in some embodiments that includes corn cob particles and/or other plant-derived particles in which a liquid fuel has been absorbed. The fuel composition may be used as a fuel material and/or to initiate combustion of a regular fuel material such as charcoal, firewood and pellet stove fuel.

20 Claims, No Drawings

COMPOSITE FUEL FOR FIRES

FIELD OF THE INVENTION

Various aspects of the present invention generally relate to a fuel composition, for example, that may be used as a fire starter for igniting barbecue charcoal, firewood, campfires, pellet stoves, and the like, and/or as a fuel material, e.g., for heating or cooking.

BACKGROUND

The following discussion is provided solely to assist the understanding of the reader, and does not constitute an admission that any of the information discussed or references cited herein constitutes prior art.

Corn is a major farm crop, resulting in large quantities of whole ear corn, as well as large quantities of corn cob following removal of corn kernels. Corn cobs are commonly used in animal feed, e.g., as roughage and/or filler. In addition, corn cobs or fractions derived from corn cobs have been used in several other applications. Thus, for example, in addition to corn cobs being used for livestock feed, the whole cobs or cob fractions have also been used for environmental remediation, e.g., as a pollution absorbent in marine oil spills, for domestic cat litter, for animal cage bedding, and for use in releasing lawn fertilizers and pesticides for example.

In addition to corn cobs and corn cob fractions, other plant derived materials with at least moderate liquid-absorbing properties have also been produced, for example, particles produced from almond shell husks.

Ethyl alcohol, i.e., ethanol, is a renewable energy source that has become increasingly popular as a fuel used either alone or combined with other fuels such as gasoline to produce "gasohol" for motor vehicles. Ethanol is routinely denatured for use as a fuel by adding any of a variety of soluble combustible organic compounds that render the ethanol undrinkable (e.g., methanol, isopropanol, acetone or methyl ethyl ketone).

Another well-known fuel is biodiesel that includes a number of fatty acid ester compounds. Typically, a biodiesel fuel is liquid and contains various fatty acid alkyl esters produced from vegetable oils and animal fats. In some cases, a biodiesel fuel does not have a particularly well-defined composition, since it is often derived from variable feedstocks (e.g., plants or animals). However, biodiesel and ethanol fuels are typically not combined with corn cob particles and/or other plant-derived particles.

SUMMARY

Various aspects of the present invention provide a fuel composition. The fuel composition may be conveniently used as a fire starter to ignite a wide variety of solid fuels that are otherwise difficult to ignite, such as barbecue charcoal, firewood and pellet fuels for stoves, and/or as a fuel material, e.g., for heating or cooking. The fuel composition may include, in some cases, plant-derived particles. The plant-derived particles may be absorbent in some embodiments. Such particles may be made from an absorbent portion of the corn cob, e.g., grit granules from the woody ring portion of the cob, or extruded pellets, that alone are not readily ignited, but that have been exposed to, and in some cases substantially saturated with, an easily ignited liquid fuel such as a blended alcohol fuel or a blended alcohol that includes fatty acid esters. Surprisingly, the liquid fuels can be supplemented in certain embodiments with a small amount of water, for instance, to promote absorption into the corn cob granules and/or to control burn rate. Such resulting fuel compositions are readily ignited, and both the corn cob and the supplementary fuel are able to co-combust.

Accordingly, in a first aspect, the invention features a fuel composition (also known as a "fire-starting fuel" or a "composite fuel") that includes corn cob particles and/or other plant-derived particles, that in some cases have absorbed a liquid fuel containing at least one flammable liquid ingredient (also known as a "flammable liquid"). The composition may be adapted to initiate combustion of a solid fuel or a regular fuel material. Generally, the fuel composition is readily ignitable, e.g., using a conventional match. In some embodiments, the particles may have been exposed to or substantially saturated with a liquid fuel.

In particular embodiments, the flammable liquid ingredient includes one or more alkyl alcohol (e.g., ethyl alcohol, isopropyl alcohol, and/or methyl alcohol), fatty acid alkyl esters, and combinations thereof; the liquid fuel contains at least 20%, at least 30%, at least 40%, or at least 50% by weight ethyl alcohol, or contains ethyl alcohol in a range of 20-50%, 20-40%, 20-30%, 30-50%, or 30-40% by weight ethyl alcohol; the liquid fuel contains isopropanol; the liquid fuel contains ethanol and isopropanol; the liquid fuel contains ethanol and isopropanol with the isopropanol constituting at least 3%, at least 5%, at least 7%, or at least 10% by weight of the liquid fuel; the liquid fuel contains ethanol and isopropanol where the decimal weight ratio of isopropanol to ethanol is in a range of 0.05 to 0.5, 0.05 to 0.3, 0.05 to 0.2, 0.1 to 0.5, 0.1 to 0.3, or 0.2 to 0.5; the liquid fuel contains ethanol and isopropanol with the isopropanol at a level (e.g., a level as specified in this paragraph) such that the isopropanol provides enhanced and sustained flame visibility during open air combustion of the composition, and/or combinations of these and/or other flammable liquid ingredients. In some cases, one or more compounds may be added to cause flame coloration during combustion. The flame coloration may be used to provide improved flame visibility that can help prevent accidental burn injuries.

In particular embodiments, the plant-derived particles are derived from cellulosic vegetable matter selected from corn cobs (e.g., particles formed from the woody ring portion of the corn cob or corn cob extrusion particles), almond shells, coconut shells, peanut shells, wood, vegetable fibers, dried citrus pulp and combinations thereof, and/or other suitable cellulosic vegetable matter; in some embodiments, the fuel composition may have particles as specified herein with any of the liquid fuels discussed herein.

In some embodiments, the liquid fuel in the fuel composition also contains water, e.g., in an amount sufficient to enhance absorption of the liquid fuel and/or of the flammable liquid ingredients (for example, anhydrous alcohol or anhydrous fatty ester fuel (e.g., decanoate, mono-methyl ester)) in the plant-derived particles and/or not in amount which substantially inhibits lighting of the fuel composition; the presence of water in the liquid fuel may significantly increase absorption of the liquid fuel and/or the flammable liquid ingredients by the particles, where a significant increase is at least 10%, at least 20%, at least 30%, at least 40%, at least 50%, at least 60%, at least 70%, or even approaching or exceeding 100% (e.g., approximately 100%) (relative to the amount of absorption that occurs in the absence of any water); the significant increase in absorption of liquid fuel or flammable liquid ingredients may be accomplished, for example, using about 5-30%, about 10-25%, about 15-25%, about 15-20%, or about 20-25% by weight water in the liquid fuel. In particular embodiments, the water forms from 3 to 30%, 5 to 25%, 5 to 20%, 5 to 15%, 10 to 30%, 10 to 25%, 10 to 20%, or 15 to 25% by weight of the liquid fuel composition. Water included in the liquid fuel may increase absorption of the liquid fuel by the corn cob and/or other plant-derived particles. In some embodiments, water included in the liquid fuel (e.g., at a level as just specified) modulates or reduces the rate of combustion of the fuel composition.

In some embodiments, the liquid fuel includes a combination of the above-described water, at least one alkyl alcohol (e.g., an alcohol as indicated above) and/or at least one fatty acid alkyl esters (e.g., mono-alkyl fatty acid esters). In some cases, these may be present in a combination in which at least one of the alcohols promotes mutual solubility of the water and/or other flammable ingredients, e.g., fatty acid alkyl esters, and/or the water promotes absorption into the corn cob and/or other plant-derived particles.

In certain embodiments, the liquid fuel may include fatty acid alkyl esters such as mono-alkyl fatty acid esters, and/or the alcohol may include ethyl alcohol.

In various embodiments, the fuel composition may be used to ignite a solid fuel or it may be used as a regular fuel material. Often, the solid fuel or the regular fuel material is considerably more difficult to ignite than the fuel composition. For example, the solid fuel or the regular fuel material may be charcoal briquettes, lump charcoal, regular coal, firewood, pellet stove fuel, or the like.

In some embodiments, the plant-derived particles are (or include) corn cob particles which are grit particles produced from the woody ring portion of the corn cob. The grit particles may contain minimal to very low levels of the nitrogen and sulfur elements (e.g., so that nitrogen and sulfur pollutant production during oxidation and combustion of the composition is minimal), e.g., where the levels of nitrogen and sulfur elements expressed as a percentage of total dried weight of corn cob grit are approximately 0.21% and 0.013% respectively, or less in some cases. These levels of 0.21% and 0.013% are, remarkably, approximately 2-fold and 20-30-fold lower than the content of these respective elements in the overall corn cob, at least in some cases. Accordingly, in some embodiments, as examples, the respective levels of nitrogen and sulfur within the corn cob grit, expressed as a percentage of total dried weight of corn cob grit, are in a range of 0.10% to 0.30% and 0.006% to 0.10% by weight respectively, or 0.15% to 0.25% and 0.010% to 0.050% respectively, or other nitrogen/sulfur ratios as described below.

Low levels of nitrogen and sulfur are desirable in some embodiments for plant-derived particles (including corn cob grit, and/or other particles as well as discussed herein). Thus in some embodiments, the respective percentages by weight of nitrogen and sulfur in the particles or mixture of absorbent particles is 0.10% to 0.30% and 0.003% to 0.10% by weight respectively, 0.15% to 0.25% and 0.003% to 0.050% respectively, 0.15% to 0.25% and 0.010% to 0.050% respectively, 0.10% to 0.30% and 0.006% to 0.10% respectively, or 0.15% to 0.25% and 0.003% to 0.030% respectively (expressed as a percentage of total dried weight).

In certain embodiments, at least 40%, at least 50%, at least 60%, or at least 70% of the corn cob grit or other plant-derived particles are retained on a #8 mesh U.S. standard mesh screen with openings measuring approximately 2.4 mm; the number average particle size is at least 1.0 mm, 1.2 mm, 1.5 mm, 1.7 mm, 2.0 mm, 2.2 mm, 2.4 mm, 2.6 mm, 2.8 mm, or 3.0 mm.

In particular embodiments, the liquid fuel or the flammable liquid ingredient of the liquid fuel within the fuel composition contains 40% to 100% by weight ethanol, from 0% to 25% by weight isopropanol, from 0% to 50% fatty acid alkyl esters, and/or from 0% to 25% by weight water.

In certain embodiments, the weight ratio of the liquid fuel (or alternatively, of a flammable liquid ingredient within the liquid fuel) to corn cob and/or other plant-derived particles in the fuel composition is in a range of approximately 0.5:1 to 2:1, approximately 0.7:1 to 1.4:1, or 0.8:1 to 1.2:1, or the weight ratio has a numerical value in a range of 0.3 to 3.0, 0.3 to 2.5, 0.3 to 2.0, 0.3 to 1.5, 0.3 to 1.2, 0.3 to 1.0, 0.5 to 3.0, 0.3 to 2.5, 0.5 to 2.0, 0.5 to 1.5, 0.5 to 1.2, 0.5 to 1.0, 0.7 to 3.0, 0.7 to 2.5, 0.7 to 2.0, 0.7 to 1.5, 0.7 to 1.2, 0.7 to 1.0, 0.8 to 2.0, 0.8 to 1.7, 0.8 to 1.5, 0.8 to 1.4, 0.8 to 1.3, 0.8 to 1.2, 0.8 to 1.1, 0.8 to 1.0, 0.9 to 2.0, 0.9 to 1.7, 0.9 to 1.5, 0.9 to 1.4, 0.9 to 1.3, 0.9 to 1.2, 1.0 to 2.0, 1.0 to 1.8, 1.0 to 1.5, 1.0 to 1.4, 1.0 to 1.3, or 1.0 to 1.2.

In some embodiments of the fuel composition, the liquid fuel and/or flammable liquid ingredient includes an alcohol selected from the group consisting of 1, 2, and 3 carbon atom-containing alcohols, and combinations thereof; or an alcohol selected from the group consisting of methanol, ethanol, isopropanol, n-propanol, and combinations thereof. In some embodiments, between 65% and 100% by weight of the liquid fuel is a mixture of alcohols. In certain embodiments, between 6% and 66% by weight is isopropanol. In some instances, between 34% and 94% by weight is ethanol. In one set of embodiments, the weight ratio of isopropanol to ethanol does not exceed 2:1. In some cases, between 0% and 25%, between 5% and 25%, between 5% and 20%, between 5% and 15%, between 10% and 25%, or between 10% and 20% by weight of the liquid fuel is water. In certain embodiments, the flammable liquid ingredient is or is predominantly methanol, ethanol, isopropanol, fatty acid alkyl esters, mineral spirits, vegetable oil, paraffin oil, and/or combinations of these and/or other compounds.

In particular embodiments, the liquid fuel or flammable liquid ingredient is or includes an alcohol-based liquid fuel and/or flammable liquid ingredient which includes ethanol and at least 6%, at least 7%, at least 10%, at least 12%, or at least 15% by weight isopropanol or other percentage of isopropanol as described in U.S. Pat. No. 5,858,031 (which is incorporated herein by reference in its entirety). For example, the isopropanol content may be in the range of 10-30%, 10-25%, 10-20%, 15-30%, or 15-25% by weight. Higher levels of isopropanol can be utilized in some cases. As a non-limiting example, enhanced and sustained flame visibility may be beneficially provided by the presence of the isopropanol in the liquid fuel.

In some embodiments, the liquid fuel is an alcohol-based liquid fuel. In some cases, the liquid fuel further includes an effective amount or concentration of at least one bittering agent, for example, denatonium benzoate (CAS Reg. No. 3734-33-6) or denatonium saccharide (CAS Reg. No. 90823-38-4). Such a bittering agent, when present, may help prevent accidental ingestion of the fuel by children, while discouraging misuse by adults. Typically effective and sufficient amounts of denatonium benzoate that can easily be solubilized in such alcohol-containing fluids range between 0.01% and 0.05% by weight, although other percentages can also be used. Other suitable bittering agents can be selected by one of ordinary skill in the art, instead and/or in addition to these.

With regard to state regulations, it is believed the fuel compositions discussed herein, in certain embodiments, meet California and/or Federal Volatile Organic Compounds (VOC) emission standards for charcoal lighter material products. Thus, in some embodiments, the fuel composition described herein produces no more than 0.020 pounds VOC per fire start according to the California South Coast Air Quality District Rule 1174 Ignition Method Compliance Certification Protocol, dated Feb. 27, 1991, or an equivalent amount under a subsequent Ignition Method Compliance Certification Protocol or alternate protocol. In some cases, the fuel composition produces no more than 0.015 pounds, 0.012 pounds, 0.01 pounds, 0.008 pounds, 0.007 pounds, 0.006 pounds, or 0.005 pounds per fire start under the cited protocol.

In some embodiments, a fuel composition as described herein may be present in, placed in, and/or packaged in a storage container (e.g., a jar, tub, or bottle, etc.) typically with a reclosable lid for storing and/or shipping the fuel composition. The container may be chemically resistant to the liquid fuel composition and/or a component thereof, for example, inherently or upon suitable treatment of the container. The reclosable lid may be a vapor-tight sealing lid to prevent evaporative loss of at least a portion of the liquid fuel, and/or other components of the fuel composition. The size of the container opening should be sufficient to allow easy dispensing, e.g., without clogging by corn cob or other plant-derived particles. For example, the container opening may have a diameter of, e.g., 1.5-2 inches, and the opening may be selected to allow such particles to readily flow from the container through the opening. The container may be fabricated from at least one thermoplastic resin. The resin may be, in some embodiments, selected from the group consisting of polyolefins, polyesters, and combinations thereof. For example, the resins may include polyethylene, polypropylene, polyethylene terephthalate (PET) and/or combinations of these and/or other plastics or polymers. The plastics can be thermoplastic, thermoset, catalyzed setting or other plastic of suitable composition. The wall thickness of the container can be, for example, between approximately 0.010 inches and approximately 0.040 inches. In some cases, the wall thickness is selected to be of sufficient durability to resist accidental breakage or penetration. In particular cases, 0.5 kg to 1 kg, 1 kg to 2 kg, 1 kg to 3 kg, 1 kg to 4 kg, 2 kg to 4 kg, or 2 kg to 5 kg of the fuel composition is placed in or packaged in the container.

Another aspect of this invention features a reclosable container that is chemically resistant to a liquid fuel and/or a flammable liquid ingredient within the lighter fuel composition, and contains at least 100 g, at least 200 g, at least 300 g, at least 400 g, at least 500 g, at least 700 g, at least 1 kg, or at least 2 kg of any fuel compositions specified for the aspect above or otherwise specified herein. The container may prevent leakage and evaporation of during storage and shipping.

Yet another aspect is directed to a method of igniting a regular fuel material. For example, some embodiments include igniting an effective amount (e.g., at least 30 g, at least 40 g, at least 50 g, at least 60 g, at least 70 g, at least 80 g, or at least 100 g) of a fuel composition as specified herein, and allowing the fuel composition to burn beneath a regular fuel material for a time at least sufficient to ignite the regular fuel material. In some cases, the fuel composition is allowed to burn until it is substantially or totally consumed. The method can also include placing the fuel composition beneath the regular fuel material prior to igniting the composition.

In particular embodiments, 30 g to 50 g, 40 g to 70 g, 50 g to 100 g, or 75 g to 100 g of the fuel composition is used as a fuel and/or to ignite the regular fuel material. The quantity of regular fuel being ignited may be, for example, at least 1 pound, at least 2 pounds, at least 3 pounds, or at least 4 pounds. The regular fuel may include, for example, charcoal briquettes, lump charcoal, regular coal, firewood and pellet stove fuel, or other fuels as discussed herein. In some embodiments, a suitable quantity of fuel composition containing corn cob and/or other plant-derived particles and a liquid fuel may be between approximately 1 ounces and approximately 10 ounces, between approximately 2 ounces and approximately 6 ounces, or between approximately 3 ounces and approximately 4 ounces by weight. In some embodiments, the type and/or amount of the regular fuel and the suitable quantity of fuel composition are as just specified, taken in each pairwise combination. In some cases, the quantity of fuel composition is selected to provide at least 6 minutes, at least 8 minutes, at least 10 minutes, at least 12 minutes, at least 15 minutes, or at least 20 minutes of burn time.

In yet another aspect, the invention features a kit that includes a pre-measured quantity of fuel composition as described herein, and a suitable quantity of charcoal, e.g., briquettes, and/or other regular fuel material, for instance, as discussed herein. The kit may also include instruction for using the fuel composition and/or the lighter fuel composition may be within a container as described herein.

In certain embodiments, the quantity of charcoal (or other regular fuel material) in the kit is at least 1 pounds, at least 2 pounds, at least 3 pounds, or at least 4 pounds, e.g., 1 pound to 4 pounds, 1 pound to 3 pounds, 2 pounds to 4 pounds, or 2 pounds to 3 pounds.

One aspect of the invention concerns a method for making a fuel composition. The method involves, in some embodiments, contacting a quantity of corn cob particles and/or other plant-derived particles with a liquid fuel such that an effective amount of the liquid fuel is absorbed by the particles. The liquid fuel may be as specified herein.

In certain advantageous embodiments, the plant-derived particles and the liquid fuel are dispensed separately (which may be simultaneously or serially) into retail containers (e.g., containers with practical capacities to contain up to 1 pound, 2 pounds, 3 pounds, 4 pounds, 5 pounds, 6 pounds, 7 pounds, or 10 pounds, etc. of fuel composition), and the liquid fuel composition allowed to absorb into the particles. In some cases, after filling the containers, the containers may be inverted, shaken, etc., at least once to provide more uniform absorption of the liquid fuel composition into the particles. In certain embodiments, the quantity of resulting fuel composition in the container is in a range of 1 pound to 3 pounds, 2 pounds to 4 pounds, 3 pounds to 6 pounds, or 5 pounds to 10 pounds, but in some cases the quantity is more, e.g., 10 pounds to 20 pounds.

In another set of embodiments, the plant-derived particles are contacted with the liquid fuel in a container, where the container has a volume of at least 100 liters, at least 300 liters, at least 500 liters, at least 700 liters, at least 1000 liters, at least 1500 liters, or at least 2000 liters. In some embodiments, the fuel composition is batch processed in containers in batches containing at least 50 kg, at least 100 kg, at least 200 kg, at least 300 kg, at least 400 kg, at least 500 kg, at least 700 kg, at least 1000 kg, at least 2000 kg, at least 3000 kg, at least 4000 kg, or at least 5000 kg of plant-derived particles.

Additional embodiments will be apparent from the Detailed Description and from the claims.

DETAILED DESCRIPTION

Various aspects of the present invention concern a fuel composition. The fuel composition can advantageously be used as a fuel (e.g., for cooking or heating) and/or as a fire starter for regular fuel materials which are more difficult to light. Examples of such harder-to-start regular fuel materials include charcoal in grills, firewood in wood stoves, logs in fireplaces, campfires, and the like. The fuel compositions discussed herein may include a naturally absorbent plant-derived particulate material, e.g., corn cob granules or particles, that has been combined (and exposed to or substantially saturated in some embodiments) with a more flammable liquid fuel, e.g., such that the particles have absorbed the liquid fuel. The liquid fuel is typically an easily ignited liquid fuel, e.g., ethanol or ethanol plus flammable fatty acid esters (e.g., $C_8$-$C_{18}$ fatty acid methyl esters). In some cases, the liquid fuels may be selected because they are non-toxic agricultural products and/or by-products, and/or are consumer-friendly renewable resources. Advantageous alcohols which may be selected for inclusion in the liquid fuel include, for example, methanol, ethanol, isopropanol, n-propanol, n-butanol, sec-butanol, tert-butanol, and combinations of these and/or other alcohols.

The liquid fuel may also include other bio-fuels such as biodiesel fuel, e.g., containing fatty acid methyl esters. Commercial fatty acid esters are typically derived from vegetable oils and animal fats, and contain alkyl chains of varying carbon length, e.g., $C_8$-$C_{18}$, that may be esterified to methyl, ethyl, or propyl moieties. Fatty acid methyl esters have been assigned standard CAS registration numbers based upon the number/range of carbon atoms in their fatty acids as follows: $C_6$-$C_{12}$, CAS Reg. No. 67762-39-4; $C_{10}$, CAS Reg. No. 110-42-9; $C_{12}$, CAS Reg. No. 111-82-0; $C_{12}$-$C_{18}$, CAS Reg. No. 68937-84-8; or $C_{16}$-$C_{18}$, CAS Reg. No. 85586-21-6. Other fatty acid methyl esters may also be used in other embodiments of the invention. These methyl esters are non-limiting examples of aliphatic organic ester compounds primarily prepared by the reaction of carboxylic fatty acids derived from natural fats and oils and methanol in the presence of a base catalyst. These esters can be processed into various alkyl range cuts by fractional distillation.

The liquid fuel can be supplemented with a modest amount of water (e.g., about 5%-25% w/w), in some embodiments. This water has been found to provide a beneficial and surprising increase in the rate and amount of absorption of the fuel into the corn cob particles (and/or other plant-derived particles, such as almond shells). It appears that when the fuel reaches a sufficient degree of hydrophilicity, its absorption into particles such as corn cob particles or other plant-derived particles substantially increases. In some cases, without a water content of approximately 5% to approximately 25% by weight, or approximately 10% to approximately 20% by weight, absorption of liquid fuels into the particles may be lower.

As mentioned, certain embodiments of the invention provides a composition useful for starting fires, such as charcoal and wood fires, for example, for cooking foods and/or heating various materials. Some aspects of the invention can also involve the packaging and/or subsequent combustion of suitable compositions. Examples of liquid fuels useful in these compositions include, but are not limited to, alcohol-based fuels which can beneficially be sequestered in corn cob particles or other plant-derived particles, e.g., grit particles. The fuel compositions may be packaged, in some cases, in suitable containers e.g., in liquid fuel-resistant (e.g., alcohol-resistant) and/or liquid fuel impermeable (e.g., alcohol-impermeable) containers such as those described herein.

The description herein emphasizes the use of corn cob grit particles and alcohol-based liquid fuels. However, it should be understood that this is by way of example only, and in other embodiments, other types of plant-derived particles may be used, instead of or in addition to corn cob grit particles. Likewise, other, non-alcohol liquid fuels may be used in other embodiments, and/or liquid fuels may be used which contain non-alcohol components together with alcohol components.

Addressing the alcohol-based liquid fuels in slightly greater detail, when alcohols containing three or more carbon atoms, e.g., propyl, isopropyl and butyl alcohols, are burned as either pure or aqueous diluted fuels, they can produce a yellow and typically sooty flame. However when the one and two carbon lower alcohols, methanol and ethanol are burned, they tend to produce flames with very little color. Absolute methanol produces only a faint bluish flame, while ethanol produces a slightly yellowish flame. Ethanol may be used in some embodiments because of its lower volatility, lower toxicity, and/or higher heat of combustion. Regarding its environmental status, ethanol is a renewable, non-polluting and biodegradable fuel.

In addition to its absorption enhancement effects, water may be useful as a diluent in the liquid fuel to increase the flash point, and therefore the safety of handling and transporting certain highly volatile fuels such as ethanol-containing fuels, e.g., in cases where a liquid fuel includes a volatile fuel therein. Water also may beneficially reduce the rate of combustion of certain types of alcohols or other liquid fuels, and thereby may be used in some embodiments to extend the duration of combustion of a fuel composition. For example, water may reduce the rate of combustion of alcohol within various particles as discussed herein, regardless of whether the alcohol is free-burned or alternatively, the alcohol burned as it volatilizes outward after being sequestered within corn grit particles or other plant-derived particles as discussed herein. This extended combustion time is helpful, for example, when the alcohol is used as a lighter fluid to ignite other regular fuel materials such as wood and charcoal, or when the lighter fuel composition is itself used as a heating fuel, for example, for heating or cooking food.

When ethanol is free-burned with a substantial concentration of water being present (e.g., more than approximately 10% by weight), its yellow flame color (which may be used as a safety feature) tends to disappear, at least under some conditions. The ethanol then burns with an essentially colorless or faint blue flame that is very difficult to see, for example, in bright sunlight. Without wishing to be bound by any theory, it is believed that water addition to ethanol may be used in some cases to reduce the rate of ethanol vaporization and combustion, thereby reducing the oxygen demand of the fire, allowing the alcohol to burn more completely and "cleaner", e.g., without appreciable yellow color. Accordingly, in some embodiments, isopropanol can be usefully added (e.g., at levels of at least 5% by weight) to an ethanol fuel mixture or a water-containing ethanol fuel mixture to restore flame coloration regardless of whether the alcohol mixture is free-burned, or sequestered and burned from within plant-derived particles (e.g., corn cob particles) as described herein.

Using the compositions and methods described herein, charcoal fires may be quickly and conveniently started, for example in barbecue grills. In contrast, it is generally appreciated that if a liquid fuel is placed in the bottom of a typical barbecue grill and free-burned without additional containment means, the burning fuel could easily leak from the grill through ventilation holes or cracks in the grill and could cause an accidental fire. Gelling agents can only partially reduce the risk of fuel leakage from a grill, and these agents add substantial cost to a liquid fuel product. When burned, such gelling agents may also add pollutants to the atmosphere or to the food product being grilled.

By comparison, fuel compositions such as those described herein using corn cob particles (and/or other plant-derived particles) may be cost-effective and/or provide a safe, solid absorbent carrier vehicle for sequestering and subsequently releasing a liquid fuel, such as the ones discussed herein. Non-limiting examples of liquid fuels include an aqueous ethanol-isopropanol blend, or an aqueous alcohol blend that includes esters of fatty acids such as methyl decanoate, methyl octanoate and other higher molecular weight molecular species including, for example, palmitic and stearic acid methyl esters (by-products from edible oils, manufactured by Procter and Gamble Chemicals, Cincinnati, Ohio). A fuel composition that includes corn cob particles (or other particles as discussed herein) exposed to or saturated with alcohol, for example, may have the essential properties of a solid fuel that overcome the risk of liquid fuel leakage and accidental fire, at least in some cases. Furthermore, particles that undergo combustion along with a liquid fuel may contribute thermal energy to the fire, and/or modulate the rate of release and combustion of the liquid fuel.

As one particular non-limiting example, for lighting regular fuel materials such as wood and/or charcoal fires, a 50-100 g quantity (approximately ½ to 1 cup by volume) of the Corn Cob Fuel (hereinafter abbreviated "CCF") material has typically proven sufficient. Therefore, a 1 kg quantity of the CCF provided in a reclosable alcohol-resistant container (e.g., a PET plastic jar) may be sufficient for lighting between ten and twenty regular log fires or barbecue charcoal fires, in which the latter may utilize 4-5 pounds of charcoal briquettes. The CCF in this particular example is prepared as and easily dispensed as free-flowing granules and deposited beneath a regular fuel to be ignited. For example, CCF granules exposed to or saturated with ethanol fuel may be dispensed and arranged in a generally flat donut-shaped bed (5-6 inches in diameter with a 1-2 inch donut hole), and having a thickness of approximately ½ inch. This bed (approximately 2-4 grit granules thick) generally sustains combustion over a period of ten minutes or more. However, other thicknesses may also be used, although combustion may proceed either too slowly and inefficiently or too quickly if the bed is, respectively, too thin or too thick. An air headspace of approximately 1-3 inches may be used to separate the CCF from the charcoal or other regular fuel material placed immediately above it. This space may provide ventilation and updraft for the fire. The CCF can be conveniently ignited with a match or other flame source to initiate combustion.

Another non-limiting example of fire-starting using a fuel composition as discussed herein, incorporating corn cob particles containing an ethanol-based liquid fuel is as follows: The charcoal support grate is removed from the grill (e.g., kettle style grills manufactured by the Weber-Stephen Product Co., Palatine, Ill.). Approximately ½ to 1 cup (50-100 g) of the fuel composition (e.g., formed using corn cob grit as granules) is placed in the bottom portion of a barbecue grill (typically 1-3 inches below the charcoal). The fuel composition may be spread out to form a loose and roughly flat horseshoe-shaped or donut-shaped bed of granules measuring approximately 5-6 inches in diameter and one-half inch thick, with an approximate 2 inch "donut hole" in the middle of the bed (providing good air circulation for combustion of the granules). The charcoal support grate is returned to its original position, and an appropriate quantity of charcoal (e.g., 4-6 pounds) is loaded onto the charcoal support grate. A lighted match or propane lighter (or any other suitable lighting technique) may be used to ignite the fuel composition. The charcoal (lumps or briquettes) can be placed or pushed to a position directly over the burning fuel composition. Within 10-15 minutes, the charcoal is adequately ignited and may be spread out on the charcoal support grate to begin cooking. Any initial unburned fuel material may in some cases also be incinerated in the course of the charcoal grilling process.

As still another non-limiting example, a similar procedure may be used to ignite firewood such as fireplace logs, except that the bed of granules described above may be formed and placed directly beneath the logs rather than beneath the charcoal. If it is desirable to reduce the distance between the bed of granules and the logs supported on andirons or a fireplace grate, the granules may be conveniently elevated 2-4 inches, for example, using a wire mesh screen (which may also provide added ventilation in some cases), fireplace bricks, construction bricks, an inverted metal pan, a platform, or other suitable spacer device.

While the compositions and methods described herein are particularly advantageous for fire starting, they can also be used as heat sources for other purposes. For example, the compositions herein can be used for heating, or even cooking foods and beverages, e.g., by burning the fuel composition beneath the food or beverage. As a non-limiting example, the compositions can be used during camping, picnicking, lighting wood fires, and the like. For such applications, the amount of fuel composition provided can readily be adapted to an intended use to provide a suitable amount of heat generated and/or a desired burn period. In addition, a smaller or larger quantity of fuel composition may also be used in some embodiments, e.g., as compared to fire starting applications.

As a result of the growth and production of substantial amounts of seed corn in the U.S., a substantial amount of corn cob by-product is also available after the kernels are removed from the cob. Corn cob is typically dried to a moisture level of approximately 10% and crushed to separate the cob into different structural/functional components including (from interior to exterior) the pith, woody ring and chaff. While the bulk density of the pith and chaff portion (abbreviated "PC") of the corn cob is approximately 8 pounds per cubic foot, the density of the grit material from the woody ring portion of the corn cob is approximately 27 pounds per cubic foot. This density difference facilitates their separation following crushing of corn cobs. In some embodiments, corn cob grit is used, although in some cases, other portions of the corn cob, e.g., the PC portion, may also be used instead of and/or in addition to the grit material. In some cases, the PC material may absorb as much as 3-fold more water than the grit material on a weight-for-weight basis.

As indicated, a variety of corn cob particle components of different types and sizes have been prepared and fractionated from the cob. These have been employed in absorbent applications including for example, use in domestic cat litter, animal cage bedding, and use in releasing lawn fertilizers and pesticides. Applicant finds no prior description or suggestion of the use of corn cob particles as a combustible fuel component and serving as a vehicle for sequestering and releasing charcoal lighter fluid or other inflammable liquids. In fact, while dried corn cob particles may be incinerated alone, they are not readily ignited by match or propane lighter.

Corn cob particles used for absorbing fuel as described herein may be provided in the form of broken granules known as corn cob grit or grit granules or grit particles (or simply "grit"), e.g., from the cob's dense woody interior ring portion. The largest commercially available grit granules (approximately ¼-⅜ inch) obtained from Mt. Pulaski Products (Mt. Pulaski, Ill.) were found to readily absorb an approximately equal amount (by weight) of an ethanol-based liquid fuel containing approximately 10%-25% by weight water. The granules absorbed much less anhydrous alcohol and poorly absorbed a conventional petroleum-based lighter fuel known as odorless mineral spirits. For example, while a 50 g quantity of dried corn cob grit granules (Cob Grit #3/8 described below) absorbed nearly an equal weight of an aqueous alcohol-based fuel (containing 68% ethanol, 12% isopropanol and 20% water by weight), the same amount of grit absorbed only approximately ⅓ of its weight of anhydrous odorless mineral spirits fuel (17 g fuel per 50 g corn grit). By contrast, an alternative water-containing biofuel blend containing fatty acid esters, alcohol and water was well absorbed by the same grit granules (1 part by weight fuel per 1 part grit). More specifically, the fuel contained 43.5% (w/w) ethanol, 42% (w/w) methyl decanoate (CAS Reg. No. 110-42-9) and 14.5% (w/w) water. Optionally, lower and/or higher molecular weight fatty acid esters including methyl octanoate (CAS Reg. No. 111-11-5), the methyl ester of octanoic acid and/or esters of the fatty acids, laurate, myristate, palmitate and stearate can be used with, or in place of methyl decanoate. Fatty acid ester fuels were obtained from Procter and Gamble Chemicals America, (Cincinnati, Ohio).

Surprisingly, in one aspect of the invention, certain fatty acid alkyl esters (e.g., fatty acid methyl ester fuels) such as those described herein that do not normally dissolve any appreciable amount of water (and therefore would be poor liquid fuel candidates for absorbing into corn cob or other plant-derived materials), may be used in liquid fuels for corn cob absorption (and/or other plant-derived materials as is discussed herein) by adding a cosolvent. The cosolvent may be any suitable cosolvent that is hydrophilic and/or miscible with water, and in some cases, the cosolvent may be chosen to be a fuel, for example, an alcohol such as any of the alcohols described herein. Typically, when water is added to a binary solvent system such as ethanol and mineral spirits, the water forms a separate phase that causes the ethanol to separate from the mineral spirits. However, surprisingly, with certain fatty acid alkyl esters such as those described herein, the addition of water does not cause phase separation to occur. Accordingly, certain fuel compositions as discussed herein may include water, which surprisingly does not cause phase separation to occur within the fuel composition. A number of companies in the U.S. including The Andersons (Cob Products, Maumee, Ohio), Green Products Company (Conrad, Iowa), Best Cob, LLC (Rock Falls, Ill.) and Mt. Pulaski Products (Mt. Pulaski, Ill.) process the dried corn cobs and commercially offer the pelletized PC (pith+chaff) material and the woody grit granules in different particle sizes. As described above, after the corn cob has been crushed, the broken material is separated into different density portions including the dense woody grit fragments and the lighter/softer PC of the cob. The grit fragments are separated into a wide variety of commercial particle sizes by mechanical sieving. Mt. Pulaski Products offers one of the larger commercial grit sizes available (known as Cob Grit #3/8 with granules having a U.S. standard mesh size of between 3 and 8 or between approximately 2.5 mm and 7 mm in diameter).

On a weight basis, the absorbency of the grit and the PC portions of the cob may range in some aspects from approximately 70% to 200%, i.e., between 0.7 g and 2.0 g of fuel is retained by 1.0 g of the dried cob material. As previously noted, woody grit fragments from the corn cob may in some cases be more robust and useful than compressed and extruded PC, in part because the grit particles maintained better structural integrity after being exposed to or substantially saturated with either alcohol-based or petroleum-based fuels, as compared to PC. In addition, grit may beneficially burn with less evolution of smoke and associated nitrogen- and sulfur-containing compounds than the extruded pellets of PC. The maximum size of the current commercially available corn cob grit may be used in certain embodiments of the invention. In the current market, particle sizes as large as ¼ to ⅜ inch (4 to 8 mesh) are available. However, it should be understood that in other embodiments of the invention, other parts of the corn cob (such as PC) may also be used, instead of and/or in addition to corn cob grit.

Without adding a liquid fuel, plain dry corn cob grits and/or extruded PC pellets can be incinerated in a flame, but they do not easily burn, and they cannot easily ignite another solid fuel.

Conventional or regular fuels (herein termed "regular fuels") include, but are not limited to lump and briquette charcoal, regular coal, pellet fuels and firewood.

As one non-limiting example, after saturating corn cob grit granules with an approximately equal amount of a liquid fuel, e.g., the above-described alcohol-based fuel (containing 68% by weight ethanol, 12% by weight isopropanol and 20% by weight water), the resulting composite corn cob fuel was found to be easily ignited and could be used to ignite regular fuels.

The following is a non-limiting example of a use of one embodiment of the invention. Combustion tests utilizing 50 g of woody corn cob grits of varying size saturated with 50 g of an alcohol-based fuel [68%-78% (w/w) ethanol+12% isopropanol+10%-20% (w/w) water] were performed. These tests have shown that the largest commercially available cob grit sizes generally provide better combustion characteristics, at least under certain conditions. The size of the largest commercial grit particles was approximately 3 mesh or about ¼ inch. Such granules in a 3-6 mesh or 3-8 mesh mixture were large enough to allow a sufficient amount of air to circulate among the granules during burning to allow combustion of the fuel. By contrast, when much smaller cob grit granules (e.g., approximately 40 mesh or 0.4 mm) were burned, the combustion products, i.e., ash, may clog the air spaces between granules. This can result in some retardation of combustion of fuel held within granules located deeper within the granular bed, at least under certain conditions.

Further, Applicant has found that limiting the thickness of the deposited bed of CCF granules to approximately ½ inch helped to assure air penetration and/or ventilation and combustion of the fuel. Also as mentioned above, to further aid in sustained combustion, the bed of CCF can be configured and arranged in some embodiments in a ring or horseshoe shape with an empty space in the center to allow more air into the burning bed of grits. Thus, in one example embodiment, approximately 50 g of dried 3-8 mesh corn cob grit material that has been exposed to or substantially saturated with approximately an equal weight of liquid alcohol-based fuel (e.g., 80%-90% by weight of ethanol or an ethanol+isopropanol blend:10%-20% by weight water) was used. The resulting 100 g (approximately 1 cup volume) of CCF material was deposited in a kettle style barbecue grill in the space approximately 2-3 inches below 4 lbs. charcoal briquettes resting on a charcoal grate. In this example, the grit material was loosely deposited and arranged in the shape of a 6 inch diameter donut-shaped bed approximately 0.5 in. thick with a 2 inch "donut hole." The CCF was ignited by match and typically burned for between 10 and 14 minutes.

Evaluated overall, Applicant finds the CCF corn cob grit material superior to the PC pellet material for absorbing, storing and releasing a fuel during combustion, particularly alcohol-based fuels containing a water component, at least in certain embodiments. That is, after the corn cob grit material has been exposed to or substantially saturated with an aqueous alcohol fuel, it maintains structural integrity, is easily ignited, and/or burns cleanly with minimal smoke evolution, at least under certain conditions.

In examining a chemical analysis of the grit portion of the cob sold by The Andersons, Inc., Applicant finds a surprisingly reduced level of two chemical elements that are known contributors to air pollution, i.e., nitrogen and sulfur (0.21% N and 0.013% S), when compared to the level of these same elements in the overall cob (0.40% N and 0.42% S). These data are consistent with Applicant's visual observations during combustion that the corn cob grit portion burns more cleanly. A reasonable hypothesis (without wishing to be bound in any way by this hypothesis) would be that most protein synthesis (requiring both nitrogen and sulfur availability) is occurring outside of the grit portion, i.e., outside the woody ring region, of the cob. Interestingly, other abundant elements in the cob, i.e., C (44%), H (7%), O (48%) and K (0.9%) are present at similar levels in both the grit and the entire cob.

Corn cob grit granules or particles are commercially available in large quantities, may be cost-effective and are readily available in a variety of standard mesh sizes. They exhibit excellent combustion characteristics when combined with alcohol-based fuels. Corn cob has the additional advantage over certain other absorbents of being an edible cellulosic material, so that its combustion in proximity to food is considered safe from a health perspective.

Notwithstanding the excellent properties of corn cob grit, a number of other food-related agricultural by-products may be useful as alternatives or additives to the grit. Some of these are absorbent to liquids while also burning cleanly, and can be substitutes or additives for corn cob grit granules. An adequate quantity of such carrier material sufficient for lighting a fire, e.g., 50-100 g, may allow enough air circulation into and around the particles or pieces of material to sustain combustion, at least in some embodiments.

For example, Applicant has found that dried broken almond shells can absorb substantial amounts of an alcohol-based fuel and, based upon limited smoke evolution, appear to burn approximately as cleanly as corn cob grit. While not generally processed on a commercial scale like corn cob, nor sieved and graded into sized particles, the almond shell and some other vegetable by-product materials exist as alternative carrier materials which can be used in various embodiments herein. For example, Applicant has sourced dried almond shells and found that the shells can absorb approximately an equal weight of an alcohol-based fuel containing 80% ethanol and 20% water (i.e., approximately the same amount as corn cob grit granules).

When exposed to or substantially saturated with a fuel such as an ethanol-based fuel, almond shells burn cleanly with very little evolution of smoke. Unlike other portions of the almond tree, but similar to the corn cob grit particles, the almond nut shell typically contains very low levels of nitrogen and sulfur (0.21% N and 0.006% S) that would otherwise contribute to air pollution. These levels of nitrogen and sulfur compare very favorably with the corn cob grit (see percentages above). Other regularly abundant chemical elements identified in the almond shell are present at levels that are very comparable to the corn cob, i.e., C (50%) and H (7%).

With regard to corn cob particles and/or other plant-derived particles and their ability to absorb a variety of liquid fuels, such as vegetable oil, mineral spirits, paraffin oil, and even fuels such as waxes that are melted to permit their absorption into corn cob grit particles have been tested, in addition to alcohol-based liquid fuels. A somewhat smoky fire with a characteristic petroleum odor results from burning odorless mineral spirits (hydrocarbon)-saturated corn cob grits. By contrast, alcohol fuel-saturated corn cob product burns with negligible smoke or odor evolution. In both cases, heat is generated from combustion of both the cob material and the exogenously introduced liquid fuel. Accordingly, a variety of liquid fuels may be used in various embodiments of the invention.

Approximately 24 hours contact time may be suitable for a liquid fuel to be absorbed and saturate ¼ inch diameter corn cob grit granules, in various embodiments. For example, in one embodiment, the liquid fuel may contain 20% water and 80% blended alcohols by weight, in which the blend contains 85% ethanol and 15% isopropanol. Under regulations governing alcohol use, the alcohol blend can, for example, be prepared by adding supplementary isopropanol to commercially available Specially Denatured Alcohol (SDA Formula No. 3-C) that contains approximately 5% isopropanol+95% ethanol. The use of SDA 3-C in fuel as described herein is approved by the U.S. Bureau of Alcohol, Tobacco, Firearms and Explosives.

Also, in certain embodiments, approximately one part by weight of a liquid fuel may be absorbed by approximately one part by weight of granules or particles. The resulting product has been referred to herein as CCF. As a non-limiting example, a quantity of 100 g of the saturated CCF granules can burn for approximately 12-14 minutes when spread out in a bed measuring approximately 5-6 inches in diameter and ½ inch thick, and placed in the bottom of a Weber kettle grill below 4 pounds charcoal briquettes resting on the charcoal support grate; once the CCF is ignited, the charcoal briquettes are typically ash-covered and ready for food grilling within 20 minutes after lighting the saturated corn cob granules or the extruded pellets.

Saturation or at least exposure of large quantities of corn cob grit and/or other plant-derived particles with aqueous alcohol solutions or other liquid fuels may be conveniently achieved using any one of a variety of liquid contact methods including, for example, (a) continuous submersion in an excess of the alcohol solution or (b) intermittent tumble-mixing or irrigation of a bed of the material by pump-recycling the alcohol solution to be absorbed. In some cases, the fuel-saturated corn cob particles or other materials may be stabilized indefinitely by providing a container or otherwise preventing the evaporative loss of the alcohol or other volatile fuels from the particles. The saturation may be complete, or the exposure may be such that the particles are not completely saturated. For example, the amount absorbed may be at least about 40%, at least about 50%, at least about 60%, at least about 70%, at least about 80%, at least about 90%, or at least about 90% saturation (on a weight percentage, where 100% is complete saturation). In some cases, the amount may be no more than about 90%, no more than about 80%, no more than about 70%, no more than about 60%, or no more than about 50% saturation.

In some instances, to be compliant in the U.S. with alcohol regulations under the national A.T.F. Agency, a standard denatured alcohol blend known as SDA 3-C that contains approximately 95% ethanol and 5% isopropanol may be utilized as a starting solution to produce the aqueous alcohol solution described above.

In some embodiments, the corn cob or other plant-derived particles may be packed directly into retail containers (e.g., PET plastic bottles), and a liquid fuel, such as an alcohol, then added. In some cases, the alcohol may be absorbed by the particles, e.g., within approximately 24 hours. In some cases, the containers (or packing cases holding the containers) may be inverted one or more times to allow contact between the fuel and the particles to occur. In some cases, there may be safety, convenience, and/or cost-savings to be realized by eliminating physical handling and transfer of large amounts of corn cob particles containing liquid fuel during packaging.

Similar preparation methods may be used for preparing any other fuel compositions described herein, e.g., incorporating other types of particles and/or other types of liquid fuels. Absorption time may be adjusted empirically for each combination of particle type and liquid fuel, in various embodiments.

In another set of embodiments, extruded PC pellets may be used, e.g., as particles within the fuel composition. Applicant has found that while corn cob PC pellets rapidly and fully disintegrate when submerged in water, these same pellets may be submerged indefinitely in an 85% by weight alcohol and 15% by weight water solution without substantially disintegrating. As a non-limiting example, after about 48 hours contact time, a 33 g quantity of this fuel was shown to saturate 50 g of Stabl-Pell® extruded pellets. Thus, the Stabl-Pell® absorbed two-thirds of its weight of 85% (w/w) alcohol. The 33 g of fuel contained 5 g of water and 28 g of an alcohol blend of 85% by weight ethanol:15% by weight isopropanol. The isopropanol component provided yellow flame coloration during combustion. The pellets burned for approximately 12 minutes when spread out in a bed approximately 4 inches in diameter, ½ inch thick (the pellets are denser than the Grit O'Cob granules and therefore form a somewhat smaller bed diameter). This amount of pellets plus alcohol (83 g total) may be sufficient, e.g., for lighting 4 pounds of charcoal.

Due to an abundance of commercial corn production in the U.S., the pricing of dried corn cob by-products such as granules and extruded pellets is favorable. Therefore, corn cob grit and pellets may be used to provide a cost-effective carrier for liquid fuels used for lighting fires, although as noted above, the present invention is not limited to only corn cob grit. Examples include the "+8 Grit O'Cob®" absorbent product (¼ inch diameter grit particles) in pallet quantities from The Andersons, Inc. (Cob Products, Maumee, Ohio), or compressed and extruded PC (pith and chaff) pellets in pallet quantities from the Andersons (known as Stabl-Pell®). Both products are 100% natural and are edible animal feed components. As explained above, while the Grit O'Cob granules (herein also termed "grit") are obtained from the fractured woody ring portion of the cob, the Stabl-Pell® pellets are produced from the pith and chaff (PC) of the cob that have been compressed and extruded, utilizing naturally present lignin as an adhesive, i.e., self-binder.

In the context of this invention, the term "fuel composition" refers to any combination discussed herein that includes a suitable flammable liquid fuel, e.g., an alcohol-based fuel (e.g., 68% by weight ethanol+12% isopropanol+20% by weight water), that has been absorbed into, and preferably substantially saturates, particles such as corn cob particles or other plant-derived particles. A non-limiting example of such a fuel composition contains approximately equal weight percentages of corn cob particles and an alcohol-based fuel. These particles can, for example, be randomly shaped broken grit granules (e.g., up to approximately ⅜ inch in diameter) from the woody ring portion of the cob, compressed extruded pellets derived from the pith and chaff of the corn cob, or the like. Both the liquid fuel and the particles may be able to burn in air once the fuel composition has been ignited, for example, by contact with a lighted match.

The term "suitable quantity" or "adequate quantity" (of the fuel composition) refers to an amount of the composition (e.g., 1-10 ounces by weight) that is at least sufficient for igniting a regular fuel material to be ignited, e.g., typical charcoal (e.g., 2-8 pounds of charcoal) and camp and fireplace wood (e.g., 3-4 dried logs). As non-limiting examples, the quantity of fuel may be 2-6 ounces, -5 ounces, or any other amounts discussed herein.

The term "flammable liquid ingredient" (aka, "flammable liquid") refers to the flammable liquid component(s) in the fuel compositions discussed herein.

The term "liquid fuel" refers to fuel components at least partially absorbed into the corn cob or plant-derived particles. The liquid fuel may contain at least one flammable liquid ingredient which may optionally be combined with one or more other flammable liquid ingredients. The liquid flammable ingredients may also optionally be combined with one or more other liquid ingredients, e.g., water, and/or have dissolved components, e.g., bittering agent. Examples of liquid fuels include those discussed herein.

In some embodiments, the fuel composition may include both plant-derived (aka vegetable-based absorbent) particles, such as corn cob particles, and a flammable liquid ingredient or a liquid fuel. In many cases, the flammable fuel ingredient of the fuel composition is alcohol-based, and in some cases, the alcohols may comprise at least 50% by weight of the combustible components in the liquid fuel. The alcohol-based fuel typically refers to an ethanol-containing fuel (e.g., 34%-94% by weight ethyl alcohol) which in some embodiments may be supplemented with isopropyl alcohol (6%-66% by weight, or 15%-30% by weight of the liquid fuel), for example, to provide flame coloration (e.g., as a safety feature). Other alcohols may be included in the liquid fuel, in addition to and/or instead of ethanol, e.g., methanol, n-propyl alcohol. Water (up to approximately 35% by weight of the final fuel liquid) may be included in some embodiments in the fuel composition to control the combustion rate and/or to extend the burn time and/or to enhance absorption of the liquid fuel into the particles. In some applications, the fuel composition may be burned for approximately 10-14 minutes, e.g., to assure that a typical charcoal or wood fire has been well ignited.

As used herein, the term "plant-derived" and "vegetable-based" are used equivalently to refer to materials which are obtained from plants or plant parts (e.g., certain portions of plants). The plant or plant parts may be obtained by mechanical methods, and in some cases without chemical extraction. Such mechanical methods may include, for example, crushing, cutting, sieving, and extrusion.

In connection with particles used for the present fuel compositions, the term "absorbent" means the particles will absorb at least 40% by weight of the selected liquid being absorbed thereto, at a normal preparation temperature. In most cases the normal preparation temperature will be approximately room temperature, e.g., approximately 25° C.

In connection with absorption of liquid fuels into particles, indication that "water that increases liquid absorption of said at least one flammable liquid ingredient" or similar phrases means inclusion of an effective amount of water in the liquid fuel together with one or more flammable liquid ingredients (for example, anhydrous alcohol or anhydrous fatty ester fuel (e.g., decanoate, mono-methyl ester)). In some embodiments, this can result in significantly increased absorption of the liquid fuel (and associated increased absorption of the flammable liquid ingredients) than occurs under absorption conditions which are essentially the same, except no water is present, e.g., in the liquid fuel. The significant increase in absorption may be at least 10%, at least 20%, and in many cases at least 30%, at least 40%, at least 50%, at least 60%, at least 70%, at least 80%, at least 90%, or even approaching or exceeding 100% (e.g., approximately 100%). The significant increase in absorption can, for example, be accomplished using about 5-30% by weight water in the liquid fuel, usually about 10-25%, 15-25%, 15-20%, or 20-25% by weight water.

In some embodiments, a storage container (e.g., PET plastic) holding the fuel composition is used. In certain cases, the storage container is "liquid fuel resistant," e.g., "alcohol-resistant." For example, the storage container may be selected to be substantially chemically unreactive such that during prolonged contact (e.g., at least 1 year or at least 2 years at room temperature) the liquid fuel within the fuel composition, e.g., with liquid fuels containing the lower alcohols listed above, is not able to substantially soften nor embrittle the container during this period due to contact with the liquid fuel. In some embodiments, the container may not show substantially warpage, chemical degradation, etc., due to prolonged contact with the liquid fuel, e.g., over a period of at least 1 year or at least 2 years at room temperature.

Similarly, the storage container and closure (e.g., PET plastic), may be selected in some embodiments to be "liquid fuel impermeable" (e.g., "alcohol-impermeable") with respect to the alcohols and/or other flammable and/or inflammable liquid components contained in fuel composition. For instance, with a liquid fuel impermeable container closure (e.g., an alcohol-impermeable container closure), less than 10% or less than 5% of the alcohol and/or other flammable liquid content of the fuel composition may be lost, e.g., via permeation of the container during a 2 year period. The container closure, sized to a sealing fit with the container, may include in some embodiments, a measuring cup feature that allows the user to easily dispense a predetermined quantity (e.g., 1/2-1 cup) of the particles.

The term "free-burning" refers to the open air combustion of the fuel composition. Free-burned fuels include, for example, those that are burned in an open reservoir, e.g., an open cup, tub, or dish, on a platform (which may be perforated or unperforated), or on a sheet of aluminum foil or on previously burned ash, or in the bottom of a fireplace or barbecue grill.

The combined use of isopropanol and ethanol to enhance and sustain flame visibility during free-burning of alcohol-based fuels is described in U.S. Pat. No. 5,858,031, incorporated herein by reference. The concentration ranges and ratios of ethanol, isopropanol and water used in blended alcohol-based fuel liquids are also described therein.

A "bittering agent" may be added to the liquid fuel component of the compositions described herein, in certain embodiments of the invention. The term refers to a chemical which, when added to a liquid fuel, has the effect of discouraging or interfering with its ingestion, particularly its accidental ingestion by children, generally by imparting a bitter taste to the composition. One example of a beneficial bittering agent is denatonium benzoate (also known as Bitrex®) which can be added to the liquid fuel at a final concentration of approximately 0.01%-0.05% by weight. This level of denatonium benzoate produces bitterness in the mouth, causes oral rejection, and is therefore considered an "effective concentration or effective amount" of this agent, which is any amount that is perceived as being bitter in the instant compositions, as evaluated by a majority of people.

Indication that "regular fuel material is considerably more difficult to ignite than the fuel composition" means that under normal use and conditions, the fuel composition will readily light using a single conventional wooden match (e.g., will ignite within about 5 seconds and usually within about 1 second) while the regular fuel material will require substantially longer (e.g., at least 2× and more often at least 5× or 10× longer time to ignite, or will even fail to ignite using a single match. For example, the present fuel composition may readily ignite, in some embodiments, using one conventional match and remain burning, while charcoal briquettes will generally fail to ignite using one conventional match. For purposes of this definition, fuels which already contain a conventional lighter fluid (e.g., match-light charcoal) are not considered regular fuels.

As used herein, the term "approximately" or "about" indicates maximum variability of +20% of the stated value unless indicated to the contrary. In certain embodiments, the range about the stated value is +10%, +5%, +2%, or even less.

The terms "conventional fuels," "regular fuels," or "regular fuel materials" are used equivalently and refer to common combustible solid materials used for heating and/or cooking fires, including lump and briquette charcoal, regular coal, pellet fuels, and firewood.

The phrase "adapted to initiate combustion of a regular fuel material" and like terms is used to mean the fuel composition is prepared from component materials in a manner and relative amounts that the fuel compositions will readily ignite in air, e.g., using a conventional match as discussed herein. In some embodiments, for example, the fuel composition will generate sufficient heat on burning that a practical amount of the fuel composition will effectively ignite a regular fuel material when the fuel composition is used to ignite the regular fuel material by being burned to substantial completion beneath the regular fuel material with a separation between fuel composition and the regular fuel material such that at least part of the surface of the regular fuel is within or in close proximity to the hottest part of the flame from the fuel composition. In some embodiments, the fuel composition does not release combustion products in types or amounts incompatible with the intended use, e.g., food cooking or room heating uses.

By "comprising" is meant including, but not limited to, whatever follows the word "comprising." Thus, use of the term "comprising" indicates that the listed elements are required or mandatory, but that other elements are optional and may or may not be present. By "consisting of" is meant including, and limited to, whatever follows the phrase "consisting of:" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, variations can be made to the composition of the liquid fuel and/or the selection of absorbent particle. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the invention and within the following claims.

What is claimed is:

1. A lighter fuel composition comprising plant-derived particles, the plant-derived particles consisting essentially of corn cob grit particles from the woody ring portion of corn cob and an absorbed liquid fuel comprising between 5% and 25% by weight of water, the absorbed liquid fuel comprising at least one flammable liquid ingredient, wherein the resulting lighter fuel composition, when deposited onto a solid fuel material and ignited, initiates combustion of the solid fuel material.

2. The lighter fuel composition of claim 1, wherein said flammable liquid ingredient is selected from the group consisting of alkyl alcohols, fatty acid alkyl esters, and combinations thereof.

3. The lighter fuel composition of claim 1, wherein said liquid fuel comprises a mixture of said water, at least one alkyl alcohol and at least one fatty acid alkyl ester.

4. The lighter fuel composition of claim 3, wherein said fatty acid alkyl esters comprise mono-alkyl fatty acid esters and said alcohol comprises ethyl alcohol.

5. The lighter fuel composition of claim 1, wherein said solid fuel material is selected from the group consisting of charcoal briquettes, lump charcoal, firewood, and pellet stove fuel.

6. The lighter fuel composition of claim 1, wherein said liquid fuel comprises at least 40% by weight ethyl alcohol.

7. The lighter fuel composition of claim 1, wherein said composition comprises no more than about 0.21% nitrogen and no more than about 0.013% sulfur.

8. The lighter fuel composition of claim 1, wherein at least 50% of said grit particles are retained on a #8 U.S. standard mesh screen with openings measuring approximately 2.4 mm.

9. The lighter fuel composition of claim 1, wherein said liquid fuel comprises between approximately 40% and 100% by weight ethyl alcohol, between 0% and 25% by weight isopropyl alcohol, between 0% and 50% fatty acid alkyl esters, and between approximately 5% and 25% by weight water.

10. The lighter fuel composition of claim 1, wherein the weight ratio of said liquid fuel to corn cob particles is between 0.5:1 and 2:1.

11. The lighter fuel composition of claim 1, wherein between 50 g and 150 g of said composition is sufficient to ignite said solid fuel material during normal use.

12. The lighter fuel composition of claim 1, wherein said at least one flammable liquid ingredient comprises an alcohol selected from the group consisting of 1, 2, and 3 carbon atom-containing alcohols, and combinations thereof.

13. The lighter fuel composition of claim 1, wherein said at least one flammable liquid ingredient comprises an alcohol selected from the group consisting of methyl alcohol, ethyl alcohol, isopropyl alcohol, n-propyl alcohol, and combinations thereof.

14. The lighter fuel composition of claim 1, wherein between 65% and 100% by weight of said liquid fuel is a mixture of alcohols of which between 6% and 66% by weight is isopropyl alcohol and between 34% and 94% by weight is ethyl alcohol, wherein the weight ratio of said isopropyl alcohol to said ethyl alcohol does not exceed 2:1, and wherein between 5% and 25% by weight of said liquid fuel is water.

15. The lighter fuel composition of claim 1, wherein said at least one flammable liquid ingredient is selected from the group consisting of methanol, ethyl alcohol, isopropyl alcohol, fatty acid alkyl esters, mineral spirits, vegetable oil, paraffin oil and combinations thereof.

16. The lighter fuel composition of claim 1, wherein at least 100 g of said composition is packaged in a re-closable container that is chemically resistant to said liquid fuel, and wherein said container prevents leakage and evaporation of said liquid fuel during storage and shipping.

17. The lighter fuel composition of claim 1, wherein said flammable liquid ingredient comprises at least 40% by weight ethyl alcohol and/or at least 40% by weight fatty acid alkyl esters.

18. A method of igniting a solid fuel material comprising igniting at least 50 g of the lighter fuel composition of claim 1, and allowing said composition to burn beneath said regular fuel material for a time sufficient to ignite said regular fuel material.

19. The method of claim 18, wherein said solid fuel material is provided in an amount of at least 2 pounds.

20. A lighter fuel composition comprising plant-derived particles, the plant-derived particles comprising grit particles from the woody ring portion of corn cob and an absorbed liquid fuel, the absorbed liquid fuel comprising at least one flammable liquid ingredient and comprising between 5% and 25% by weight of water, wherein the resulting lighter fuel composition, when deposited onto a solid fuel material and ignited, initiates combustion of the solid fuel material, and wherein said plant-derived particles contain levels of nitrogen and sulfur that are lower than nitrogen and sulfur levels in overall corn cob.

* * * * *